United States Patent
Negishi et al.

(10) Patent No.: US 8,169,554 B2
(45) Date of Patent: May 1, 2012

(54) PROJECTION DISPLAY APPARATUS AND DISPLAY METHOD USING THE SAME

(75) Inventors: Ichiro Negishi, Yokohama (JP); Nobuki Nakajima, Yokohama (JP)

(73) Assignee: Victor Company of Japan, Ltd., Kanagawa-Ken (JP)

(*) Notice: Subject to any disclaimer, the term of this patent is extended or adjusted under 35 U.S.C. 154(b) by 298 days.

(21) Appl. No.: 12/657,476

(22) Filed: Jan. 21, 2010

(65) Prior Publication Data

US 2010/0195005 A1 Aug. 5, 2010

(30) Foreign Application Priority Data

Jan. 30, 2009 (JP) ................................. 2009-019391

(51) Int. Cl.
*G02F 1/1335* (2006.01)

(52) U.S. Cl. ..................................... 349/8; 349/5; 349/9

(58) Field of Classification Search .......................... None
See application file for complete search history.

(56) References Cited

U.S. PATENT DOCUMENTS

| | | | |
|---|---|---|---|
| 6,563,551 B1 * | 5/2003 | Janssen et al. | 348/759 |
| 2003/0025845 A1 * | 2/2003 | Murakami et al. | 349/5 |
| 2006/0285025 A1 * | 12/2006 | Yoshida et al. | 349/8 |
| 2007/0252918 A1 * | 11/2007 | Furuya et al. | 348/742 |
| 2008/0055529 A1 * | 3/2008 | Shirasaka et al. | 349/143 |
| 2009/0086112 A1 * | 4/2009 | Kaida et al. | 349/9 |

FOREIGN PATENT DOCUMENTS

| | | |
|---|---|---|
| JP | 2003-186456 | 7/2003 |
| JP | 2007-003809 | 1/2007 |

* cited by examiner

*Primary Examiner* — Tina Wong (74) *Attorney, Agent, or Firm* — Renner, Kenner, Greive, Bobak, Taylor & Weber (57) ABSTRACT

A projection display apparatus has a beam controller provided on the optical axis of an optically-modulated linearly-polarized beam, to allow the beam to travel therethrough to reach a screen or cut off the beam, under control by a control signal. The controller, has driving zones on which the beam is incident. The zones are provided in a direction corresponding to a vertical scanning direction of pixels of a liquid crystal display device installed in the display apparatus, for optically modulating a linearly polarized beam. The controller is driven per driving zone in a specific zone order at a timing of vertical scanning of the pixels under control by the control signal generated based on a vertical synchronization signal detected from the input signal. The optically modulated beam is allowed to travel through the controller or cut off when incident on the zones at the timing of the vertical scanning.

9 Claims, 10 Drawing Sheets

FIG. 1

↕ P-POLARIZED
⊙ S-POLARIZED

PROJECTION DISPLAY APPARATUS AND DISPLAY METHOD USING THE SAME

CROSS-REFERENCE TO RELATED APPLICATIONS

This application is based on and claims the benefit of priority from the prior Japanese Patent Application No. 2009-019391 filed on Jan. 30, 2009, the entire contents of which is incorporated herein by reference.

BACKGROUND OF THE INVENTION

The present invention relates to a projection display apparatus and a display method using the projection display apparatus, achieving less persistence of vision for images to be displayed when beams are projected onto a screen via a projection unit even after undergoing optical modulation by an optical modulator of a relatively low response time based on input signals.

A display apparatus now widely used is a projection display apparatus equipped with liquid crystal display devices that optically modulate input light beams based on external input signals that carry video data, the modulated beams being enlarged and projected onto a screen, as disclosed in Japanese Unexamined Patent Application Publication No. 2007-003809 (referred to as Citation 1, hereinafter).

Such liquid crystal display devices are usually driven to switch frames depending on a frame frequency in such a way that, for example, at a frame frequency of 60 Hz, each frame is kept for 1/60 seconds before switched to the next frame.

Such a driving technique could, however, cause persistence of vision because a user recognizes an image now displayed and the next image when the next image is to be displayed. The persistence of vision often occurs when images to be displayed are rapidly moving images of something, such as, a specific kind of sports.

One technique to reduce the persistence of vision is disclosed in Japanese Unexamined Patent Application Publication No. 2003-186456 (referred to as Citation 2, hereinafter).

The liquid crystal display devices disclosed in Citation 2 are equipped with a mechanism of alternately and repeatedly displaying video images and black images by switching driving voltages to be applied to the liquid crystals and another mechanism of alternately displaying video images and black images at every second frame and at a frequency at least two times higher than a regular frame frequency.

However, the technique disclosed in Citation 2 requires switching circuitry for input or drive signals, which could make the liquid crystal display devices and/or projection display apparatus expensive. Moreover, the technique disdosed in Citation 2 divides a regular display period into at least two for displaying a black image, which thus not so advantageous for the liquid crystal display devices of a relatively low response time.

Moreover, when the technique of Citation 2 is applied to the projection display apparatus of Citation 1 in which a video image is enlarged when projected onto a screen, more persistence of vision could be caused for a projected video image, compared to a direct-view liquid crystal display apparatus.

SUMMARY OF THE INVENTION

A purpose of the present invention is to provide a projection display apparatus and a display method using the projection display apparatus that can reduce persistence of vision for enlarged and projected images of a rapidly moving object and for liquid crystal display devices of a relatively low response time.

The present invention provides a projection display apparatus comprising: a light source to emit a light beam; an illumination optical system through which the emitted light beam undergoes linear polarization; at least one liquid crystal display device to optically modulate the linearly-polarized light beam based on an input signal; a projection optical system to enlarge the optically-modulated light beam and project the enlarged light beam onto a screen; and a light-beam controller provided on an optical axis of the optically-modulated light beam, to allow the optically-modulated light beam to travel therethrough to reach the screen or cut off the optically-modulated light beam, under control by a control signal, wherein the light-beam controller has a plurality of driving zones on which the optically-modulated light beam is incident, the driving zones being provided in a direction corresponding to a vertical scanning direction of pixels of the liquid crystal display device, the light-beam controller being driven per driving zone in a specific order of the driving zones at a timing of vertical scanning of the pixels under control by the control signal that is generated based on a vertical synchronization signal detected from the input signal, thus the optically-modulated light beam being allowed to travel through the light-beam controller or cut off when the optically-modulated light beam is incident on the driving zones at the timing of the vertical scanning.

Moreover, the present invention provides a display method for a projection display apparatus including at least one liquid crystal display device to optically modulate an input linearly-polarized light beam based on an input signal, the linearly-polarized light beam thus optically modulated being enlarged and projected onto a screen, and a light-beam controller provided on an optical axis of the optically-modulated light beam, the light-beam controller having a plurality of driving zones on which the optically-modulated light beam is incident, the driving zones being provided in a direction corresponding to a vertical scanning direction of pixels of the liquid crystal display device, the method comprising the steps of: detecting a synchronizing signal from the input signal; sequentially driving the pixels of the liquid crystal display device based on the input signal in accordance with the detected synchronizing signal, thus the input linearly-polarized light beam being optically modulated; and controlling the optically-modulated light beam by driving the light-beam controller per driving zone in a specific order of the driving zones at a timing of vertical scanning of the pixels under control by a control signal that is generated based on a vertical synchronization signal detected from the input signal, thus the optically-modulated light beam being allowed to travel through the light-beam controller to reach the screen or cut off when the optically-modulated light beam is incident on the driving zones at the timing of the vertical scanning.

DETAILED DESCRIPTION OF PREFERRED EMBODIMENT

A preferred embodiment according to the present invention will be disclosed with reference to the attached drawings.

Figure 1:
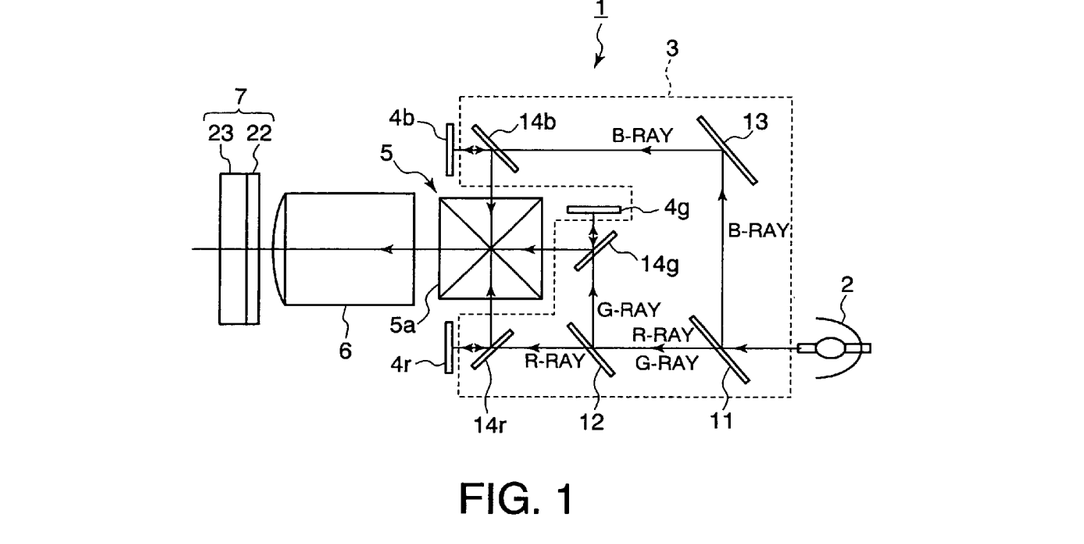
FIG. 1 shows a schematic illustration of a projection display apparatus, as a preferred embodiment of the present invention.

FIG. 1 shows a schematic illustration of a projection display apparatus 1, as a preferred embodiment of the present invention.

As shown in FIG. 1, the projection display apparatus 1 is equipped with: a light source 2; an illumination optical system 3, liquid crystal display devices 4r, 4g and 4b, a color-combining optical system 5; a projection optical system 6; and a light-beam controller 7.

The light source 2 may be an ultra-high pressure mercury lamp or a xenon lamp, for emitting a white light. Or, it may be a semiconductor light source that emits a white light or three beams of a red ray (referred to as R-ray, hereinafter), a green ray (referred to as G-ray, hereinafter) and a blue ray (referred to as B-ray, hereinafter).

The present embodiment which will be described below is equipped with a xenon lamp as the light source 2.

The illumination optical system 3 is equipped with: a first dichroic filter 11 (a first color-separation filter); a second dichroic filter 12 (a second color-separation filter), a reflection mirror 13; and polarizers 14r, 14g and 14b.

In this embodiment, on receiving a white light from the light source 2 (the xenon lamp), the first dichroic filter 11 reflects a beam of B-ray whereas allows beams of R- and G-rays to pass therethrough to reach the second dichroic filter 12 that reflects the beam of G-ray while allows the beam of R-ray to pass therethrough.

The polarizers 14r, 14g and 14b are a wire-grid polarizer in this embodiment, however, they may be a polarization beam splitter that splits an incident beam at a polarization slitting plane so that a traveling linearly-polarized beam and a reflected linearly-polarized beam are perpendicular to each other.

The liquid crystal display devices 4r, 4g and 4b are a reflective type in this embodiment, which may, however, be a transparent type, each requiring a dedicated optical system.

The color-combining optical system 5 is a cross dicroic prism having a function of combining beams of R-, G-, and B-rays from the reflective liquid crystal display devices 4r, 4g and 4b, respectively, in this embodiment.

The projection optical unit 6 is a projection lens in this embodiment.

The light-beam controller 7, which will be described later in detail, is equipped with a wavelength-selective polarizer 22 that converts incident beams into a single polarization state and a liquid crystal shutter 23 that cuts off the incident beams based on input signals.

Discussed next with reference to FIG. 1 is a passage of a white light incident from the light source 2 and then emitted from the light-beam controller 7, through optical modulation by the liquid crystal display devices 4r, 4g and 4b.

In FIG. 1, a white light emitted from the light source 2 is incident on the first dichroic filter 11 that is provided as inclined at 45 degrees to the optical axis of the beams of white light.

At the first dichroic filter 11, a beam of B-ray in the range of a blue-color wavelength undergoes optical-axis bending at 90 degrees, thus reflected therefrom whereas beams of G- and R-rays in the ranges of green- and red-color wavelengths, respectively, travel therethrough.

The beam of B-ray reflected at the first dichroic filter 11 is incident on the reflection mirror 13 that is provided as inclined at 45 degrees to the optical axis of the beam of B-ray and undergoes optical-axis bending at 90 degrees, thus reflected therefrom.

The beams of G- and R-rays traveling through the first dichroic filter 11 are incident on the second dichroic filter 12 that is provided as inclined at 45 degrees to the optical axes of the beams of G- and R-rays. The beam of G-ray undergoes optical-axis bending at 90 degrees and reflected at the second dichroic filter 12. The beam of R-ray, however, travels through the second dichroic filter 12.

The beam of B-ray reflected at the reflection mirror 13, the beam of G-ray reflected at the second dichroic filter 12, and the beam of R-ray traveling through the second dichroic filter 12 are incident on the wire-grid polarizers 14b, 14g and 14r, respectively, each provided as inclined at 45 degrees to the optical axis of the beam of respective rays.

In the beams of R-, G- and B-rays incident on the wire-grid polarizers 14r, 14g and 14b, respectively, only the beams of linearly polarized in a specific direction travel through the wire-grid polarizers 14r, 14g and 14b and are incident on the reflective liquid crystal \display devices 4r, 4g and 4b.

The beams of R-, G- and B-rays undergo linear polarization at the wire-grid polarizers 14r, 14g and 14b, respectively, in this embodiment, which may, however, undergo linear polarization at an earlier stage in a modified optical system provided closer to the light source 2.

Another modified optical system applicable to this invention is a polarization converting system that converts unpolarized light into p-and s-polarized beams and further converts either the p- or s-polarized beam via a phase plate to have either the s- or p-polarized beams only for higher utility of the light emitted by the light source 2.

The linearly polarized beams incident on the reflective liquid crystal display devices 4r, 4g and 4b undergo optical modulation based on externally-input device drive signals for the respective colors and are then reflected therefrom as optically modulated beams.

The optically modulated beams reflected from the reflective liquid crystal display devices 4r, 4g and 4b are incident on the wire-grid polarizers 14r, 14g and 14b, respectively, and undergo optical-axis bending at 90 degrees, thus being reflected therefrom.

The optically modulated beams of the colors R, G and B reflected from the wire-grid polarizers 14r, 14g and 14b, respectively, are incident on the cross dicroic prism 5 at the three planes, except for an emitting plane 5a, combined into a video beam in the prism 5 and then emitted from the emitting plane 5a.

In this embodiment, the optical systems described above are adjusted for the optically modulated beams of the colors R, G and B so that the optically modulated beams of B- and R-rays are put in an s-polarized state whereas the optically modulated beam of G-ray is put in a p-polarized state when emitted from the cross dicroic prism 5.

The video beam emitted from the cross dicroic prism 5 is incident on the projection lens 6 to be enlarged for projection. The video beam enlarged by the projection lens 6 is incident on the light-beam controller 7. Bases on externally input drive signals, the light-beam controller 7 cuts off the enlarged video beam or allows the beam to travel through. The enlarged video beam allowed to travel through the light-beam controller 7 is projected onto a screen (not shown).

Figure 2:
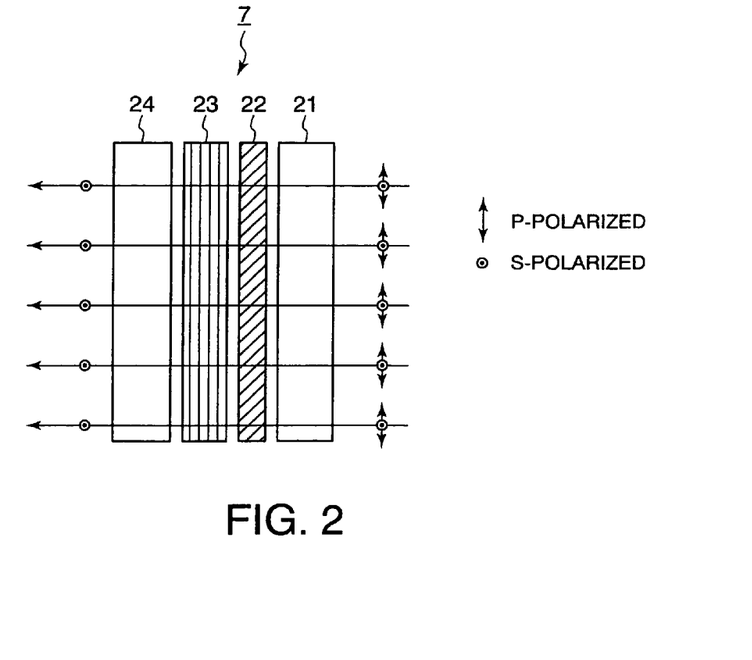
FIG. 2 shows an enlarged schematic plan view of a light-beam controller equipped with a liquid crystal shutter, having a polarization conversion function, for the projection display apparatus shown in FIG. 1 as an embodiment of the present invention.

The light-beam controller 7 is described in detail with respect to FIG. 2.

As shown in FIG. 2, the light-beam controller 7 is constituted by an anti-reflection film-coated glass 21, the wavelength-selective polarizer 22, the liquid crystal shutter 23, and another anti-reflection film-coated glass 24, arranged in order from the video-beam incident side. The anti-reflection film-coated glasses 21 and 24 are not shown in FIG. 1 for brevity.

The anti-reflection film-coated glass 21 is coated with an anti-reflection film at the linearly-polarized video-beam incident side to prevent the incident beam from being reflected at the interface between the ambient air and the glass 21.

The anti-reflection film-coated glass 24 is coated with an anti-reflection film at the linearly-polarized video-beam emitting side to prevent the emitting beam from being reflected at the interface between the ambient air and the glass 24.

The wavelength-selective polarizer 22 functions to rotate the optical axis of beam components of a specific wavelength range by 90 degrees and emit the axis-rotated beam whereas emit beam components out of the specific wavelength range with no axis rotation, for the incident linearly-polarized video beam.

The wavelength-selective polarizer 22 is provided so as to put the incident beams into a single polarization state. As already described, the optically modulated beams of B- and R-rays have been put in the s-polarized state whereas the optically modulated beam of G-ray has been put in the p-polarized state when incident on the light-beam controller 7, in this embodiment. Thus, the wavelength-selective polarizer 22 functions to rotate the optical axis of the beam of G-ray by 90 degrees so that the emitting beams are all in the s-polarized state.

The liquid crystal shutter 23 drives the liquid crystals filled therein based on externally input shutter control signals to control the polarization state of the incident linearly-polarized video beam so that the beam is cut off or allowed to travel therethrough.

Figure 3:
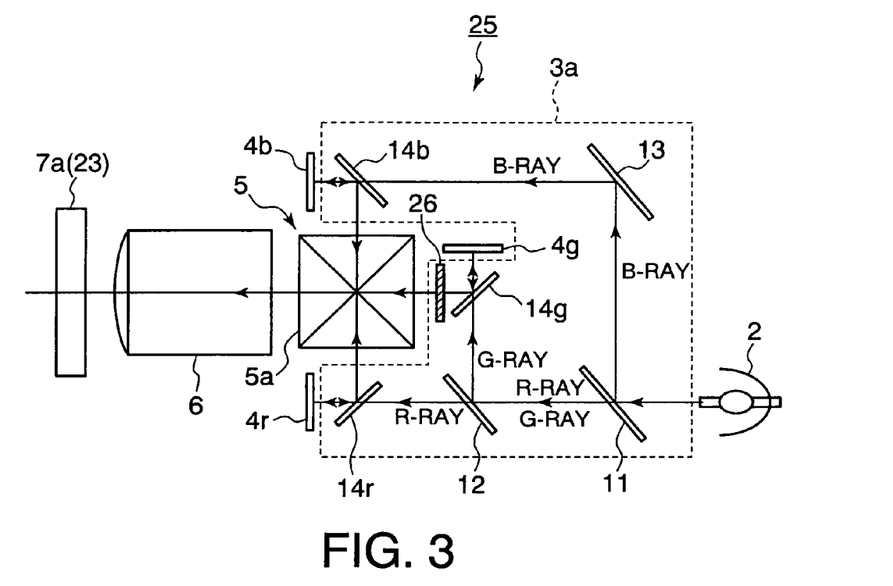
FIG. 3 shows a schematic illustration of a modification to the projection display apparatus shown in FIG. 1 as an embodiment of the present invention.

Described next with reference to FIG. 3 is a modification to the projection display apparatus 1 shown in FIG. 1.

As shown in FIG. 3, a projection display apparatus 25 is different from the projection display apparatus 1 in that: a polarizer 26 for rotating the optical axis of a beam of G-ray is provided on the optical path of a beam of G-ray optically modulated by the reflective liquid crystal display devices 4g for G-ray and between the wire-grid polarizer 14g and the cross dicroic prism 5; and a light-beam controller 7a having the liquid crystal shutter 23 only (without the wavelength-selective polarizer 22) is provided instead of the light-beam controller 7. The polarizer 26 does not necessarily to function as the wavelength-selective polarizer 22, or does not necessarily to have any characteristics with respect to the wavelength.

With the configuration described above, all of the optically modulated beams of R-, G- and B-rays incident on the cross dicroic prism 5 are put in the s-polarized state.

Figure 4:
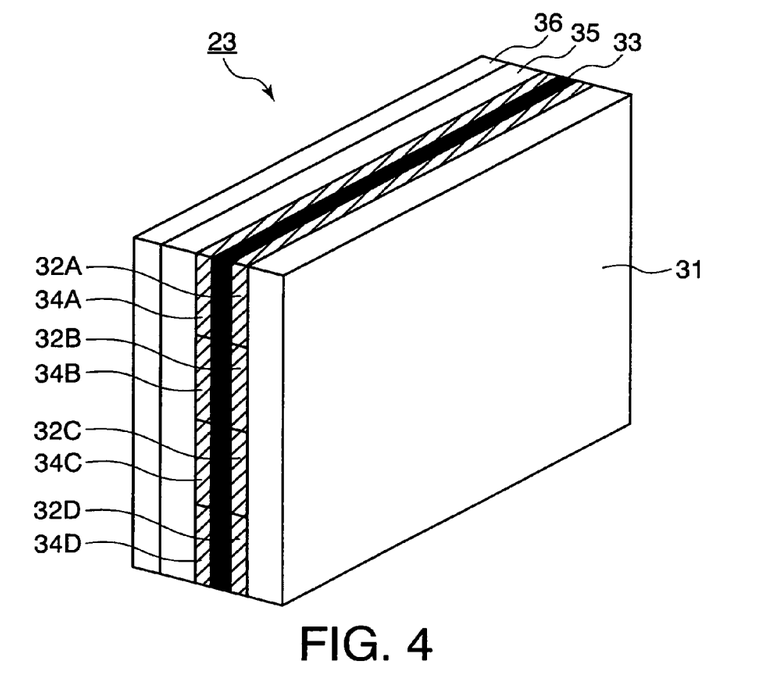
FIG. 4 shows an enlarged schematic perspective view of the liquid crystal shutter shown in FIG. 2 for the projection display apparatus shown in FIG. 1 as an embodiment of the present invention or that shown in FIG. 3 as a modification.

Described next with reference to FIG. 4 is the liquid crystal shutter 23 shown in FIGS. 1 and 3.

As shown in FIG. 4, the liquid crystal shutter 23 is constituted by: an anti-reflection film-coated glass 31; incident-side transparent conductive films 32A, 32B, 32C, and 32D; a liquid crystal layer 33; emitting-side transparent conductive films 34A, 34B, 34C, and 34D; an anti-reflection film-coated glass 35; and a polarizer 36, arranged in this order from the video beam-incident side.

The anti-reflection film-coated glass 31 is coated with: an anti-reflection film at the beam incident side to prevent the incident beam from being reflected at the interface between the ambient air and the glass 31; and the transparent conductive films 32A, 32B, 32C, and 32D at the beam emitting side.

The anti-reflection film-coated glass 35 is coated with: an anti-reflection film at the beam emitting side to prevent the emitting beam from being reflected at the interface between the ambient air and the glass 35; and the transparent conductive films 34A, 34B, 34C, and 34D at the beam incident side.

Filled in the gap between the incident-side transparent conductive films 32A to 32D and the emitting-side transparent conductive films 34A to 34D are liquid crystals to compose the liquid crystal layer 33.

The polarizer 36 is provided on the anti-reflection film-coated glass 35 at the beam emitting side. Combined with the liquid crystal layer 33, the polarizer 36 functions as a shutter for linearly polarized video beams. In this embodiment, the polarization axis of the polarizer 36 is adjusted so that a linearly polarized video beam emitted from the liquid crystal layer 33 is cut off when a specific voltage is applied to the liquid crystal layer 33 based on a shutter control signal.

As a variation, the polarization axis of the polarizer 36 may be adjusted so that a linearly polarized video beam emitted from the liquid crystal layer 33 is cut off when no specific voltage is applied to the liquid crystal layer 33, in the opposite phase of the voltage to be applied in the embodiment described above.

Described next is the liquid crystal shutter 23 having twisted nematic (TN) liquid crystals driven in a normally white mode. The TN liquid crystals have the chiral structure in which liquid crystal molecules are aligned in 90-degree different directions between the beam incident and emitting sides. The linearly polarized beam is then rotated by 90 degrees while traveling through the TN liquid crystals. The axis of transmission of the polarizer 36 is adjusted so that the 90-degree-rotated linearly polarized beam is allowed to travel through the polarizer 36. According to the axis adjustments, the polarizer 36 allows the linearly polarized beam to travel therethrough when no voltage is applied to the liquid crystal layer 33.

When a voltage is applied to the liquid crystal layer 33, the TN liquid crystal molecules are aligned in the same direction as the incident linearly polarized beam so that the beam travels through the liquid crystal layer 33 with no change in the polarization state. The axis of transmission of the polarizer 36 is adjusted as being orthogonal to the linearly polarized beam traveling through the liquid crystal layer 33 so that the beam is not allowed to travel through the polarizer 36.

Accordingly, the liquid crystal shutter 23 functions to cut off the incident linearly polarized beam when a voltage is applied to the liquid crystal layer 33 whereas allows the beam to travel therethrough when no voltage is applied to the liquid crystal layer 33.

The liquid crystal shutter 23 described above employs the TN liquid crystals in the normally white mode. However, the liquid crystal shutter 23 can function with TN liquid crystals in a normally black mode or a different type of liquid crystals in the normally white or black mode.

Figure 5:
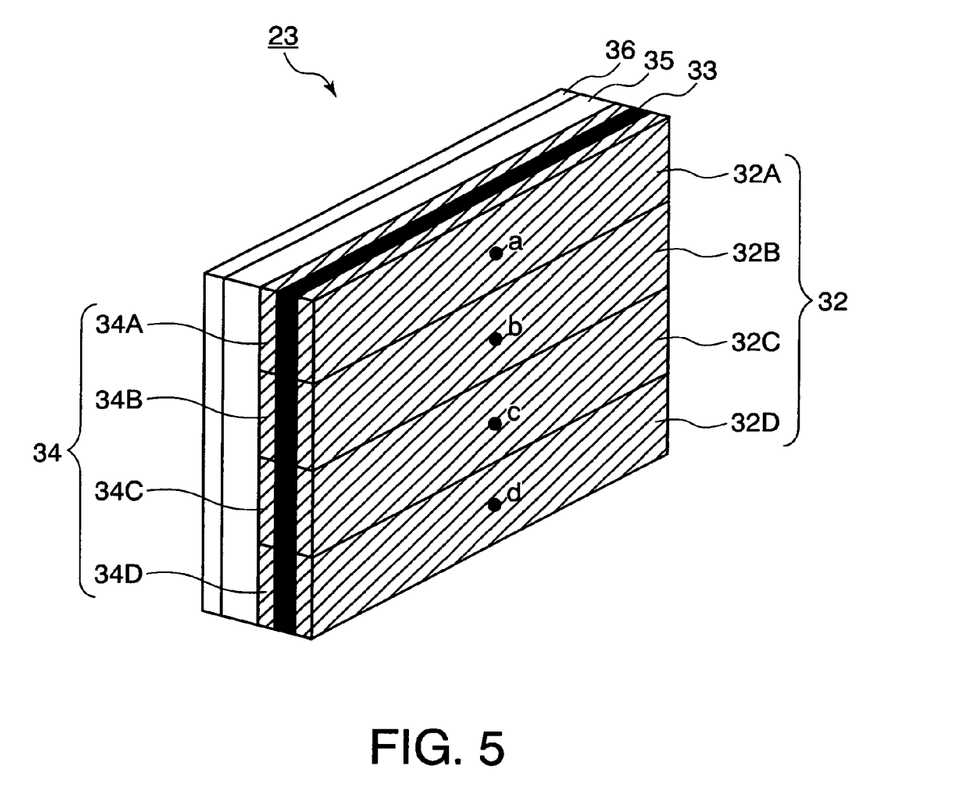
FIG. 5 shows an enlarged schematic perspective view of the liquid crystal shutter shown in FIG. 4, in which one of anti-reflection film-coated glasses is omitted to show transparent conductive films provided at the beam incident side.

Shown in FIG. 5 is the liquid crystal shutter 23 in which the anti-reflection film-coated glass 31 is omitted to show that the incident-side transparent conductive films 32A, 32B, 32C, and 32D constitute four zones of an incident-side transparent conductive film area 32, or the area 32 is divided into the four zones.

Although not shown clearly in FIG. 5, the emitting-side transparent conductive films 34A, 34B, 34C, and 34D also constitute four zones of an emitting-side transparent conductive film area 34, or the area 34 is divided into the four zones. The number of zones into which the conductive film is divided can be increased or decreased.

The transparent conductive films can be made of Indium Tin Oxide (ITO), zinc oxide, etc.

The divided incident- and emitting-side transparent conductive films can be formed with a mask applied to each zone discussed above or with a transparent conductive film coated on a substrate entirely and etched away from between the zones.

Figure 6:
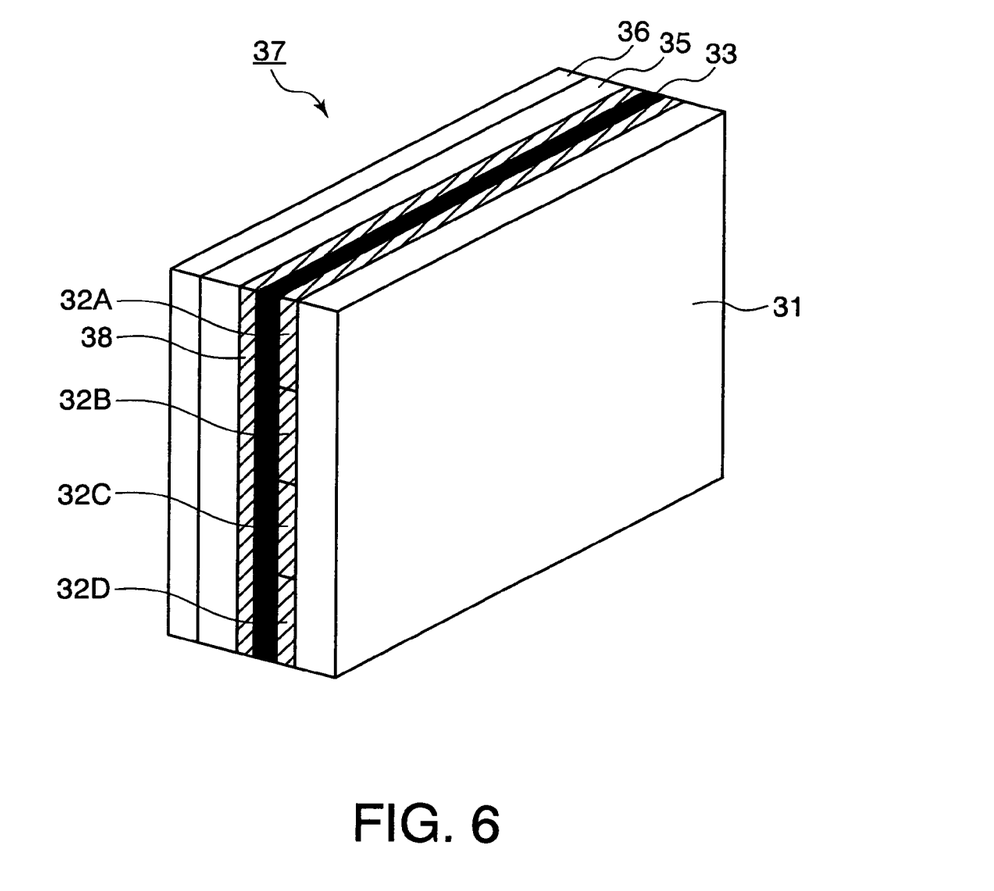
FIG. 6 shows an enlarged schematic perspective view of a modification to the liquid crystal shutter for the projection display apparatus shown in FIG. 1 as an embodiment of the present invention or that shown in FIG. 3 as a modification.

Shown in FIG. 6 is a liquid crystal shutter 37, a modification to the liquid crystal shutter 23.

Different from the liquid crystal shutter 23, the liquid crystal shutter 37 employs an emitting-side transparent conductive film 38 coated entirely (without being divided) on the anti-reflection film-coated glass 35 at the incident side.

Such an entirely-coated transparent conductive film 38 may be provided on the anti-reflection film-coated glass 31. One requirement of the liquid crystal shutter in the invention is that at least either of the transparent conductive films formed on the anti-reflection film-coated glasses 31 or 35 is divided into several zones.

Figure 7:
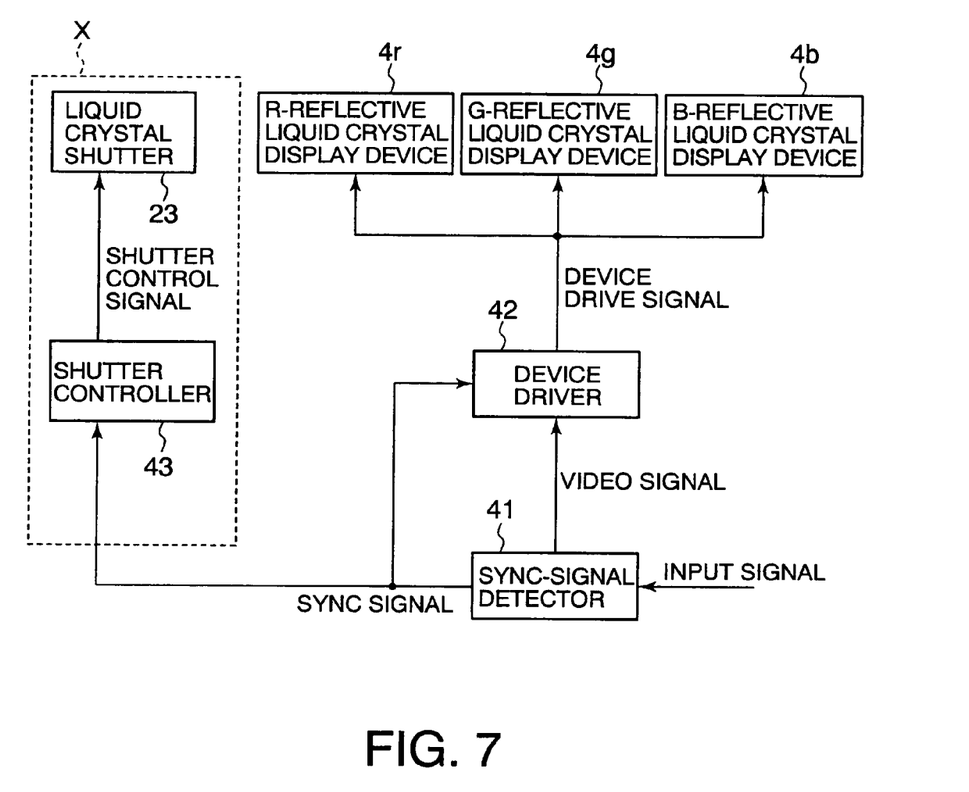
FIG. 7 shows a block diagram of drive circuitry used for the projection display apparatus shown in FIG. 1 or 3, provided with the liquid crystal shutter shown in FIG. 4.

Described next with respect to FIG. 7 is a block diagram of drive circuitry used for the projection display apparatuses 1 and 25 shown in FIGS. 1 and 3, respectively, provided with the liquid crystal shutter 23 shown in FIG. 4.

As shown in FIG. 7, the drive circuitry includes a sync-signal detector 41, a device driver 42, and a shutter controller 43.

An external input signal carrying video information is divided by the sync-signal detector 41 into a video signal and a synchronization (sync) signal. The video signal is supplied to the device driver 42. The sync signal is supplied to the device driver 42 and the shutter controller 43.

When receiving the sync signal, the device driver 42 generates device drive signals for R-, G-, and B-rays based on horizontal and vertical sync signal components of the sync signal and supplies the device drive signals to the reflective liquid crystal display devices 4r, 4g and 4b. for R-, G-, and B-rays, respectively, for optical modulation of incident beams.

The shutter controller 43 generates a shutter control signal based on the received sync signal and supplies the control signal to the liquid crystal shutter 23 to drive the liquid crystal layer 33 (FIG. 4) for control of the polarization state of a video beam traveling through the layer 33, thus the beam being allowed to travel or cut off by the polarizer 36.

Figure 8:
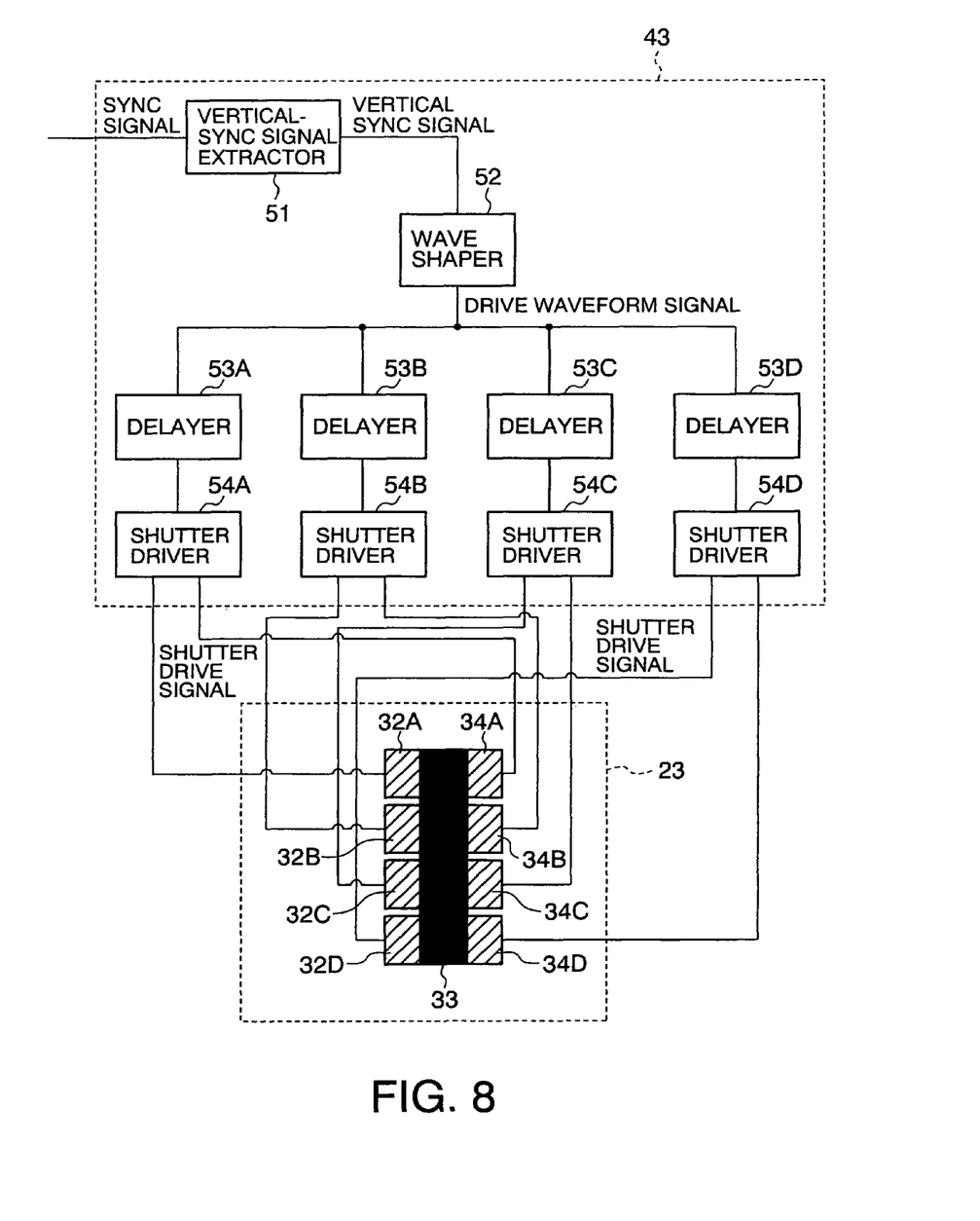
FIG. 8 shows a block diagram of the liquid crystal shutter and the shutter controller shown in FIG. 7.

Described next in detail with reference to FIG. 8 are the liquid crystal shutter 23 and the shutter controller 43 enclosed by a dot line with a sign "x" in FIG. 7.

The shutter controller 43 includes: a vertical-sync signal extractor 51; a wave shaper 52; delayers 53A, 53B, 53C, and 53D; and shutter drivers 54A, 54B, 54C, and 54D.

When a sync signal is supplied to the shutter controller 43, a vertical-sync signal component is extracted by the vertical-sync signal extractor 51 and supplied to the wave shaper 52.

The wave shaper 52 shapes a drive waveform signal based on the received vertical-sync signal component. The drive waveform signal is then supplied to the delayers 53A, 53B, 53C, and 53D.

There are four delayers (53A, 53B, 53C, and 53D) provided for the incident-side transparent conductive films 32A, 32B, 32C, and 32D, and the emitting-side transparent conductive films 34A, 34B, 34C, and 34D.

Liquid crystal display devices display an image with vertical scanning, so that a 1-frame image is displayed at different timings on the pixels arranged on different lines.

Under consideration of the display timings, in this embodiment, each of the transparent electrodes used for driving the liquid crystal layer 33 of the liquid crystal shutter 23 is divided into the four zones (corresponding to the incident- and emitting-side transparent conductive films 32A to 32D and 34A to 34D) so that the liquid crystal layer 33 can be driven at a scanning timing at respective positions of an image to be projected and carried by a video beam.

In other words, an area of the liquid crystal shutter 23 through which a video beam is to travel is divided into the four zones vertically for driving the liquid crystal layer 33 at a scanning timing of each zone, which requires the delayers 53A, 53B, 53C, and 53D.

When a drive waveform signal is supplied to the delayers 53A, 53B, 53C, and 53D from the wave shaper 52, it is delayed by a certain period at each delayer. Delayed drive waveform signals are then supplied from the delayers 53A, 53B, 53C, and 53D to the shutter drivers 54A, 54B, 54C, and 54D, respectively.

The delayed drive waveform signals supplied to the shutter drivers 54A, 54B, 54C, and 54D undergo voltage conversion depending on the drive voltage to the liquid crystal layer 33 to be converted into shutter drive signals. The shutter drive signals are then supplied to the incident- and emitting-side transparent conductive films 32A to 32D and 34A to 34D to drive the liquid crystal layer 33.

In driving the liquid crystal layer 33, the voltage supplied to each of the incident-side transparent conductive films 32A to 32D is varied when the emitting-side transparent conductive films 34A to 34D are set at a ground potential, which can be vice versa. In the case of the liquid crystal layer 37 shown in FIG. 6, the emitting-side transparent conductive film 38 coated entirely on the anti-reflection film-coated glass 35 requires to be set at a ground potential.

Figure 9:
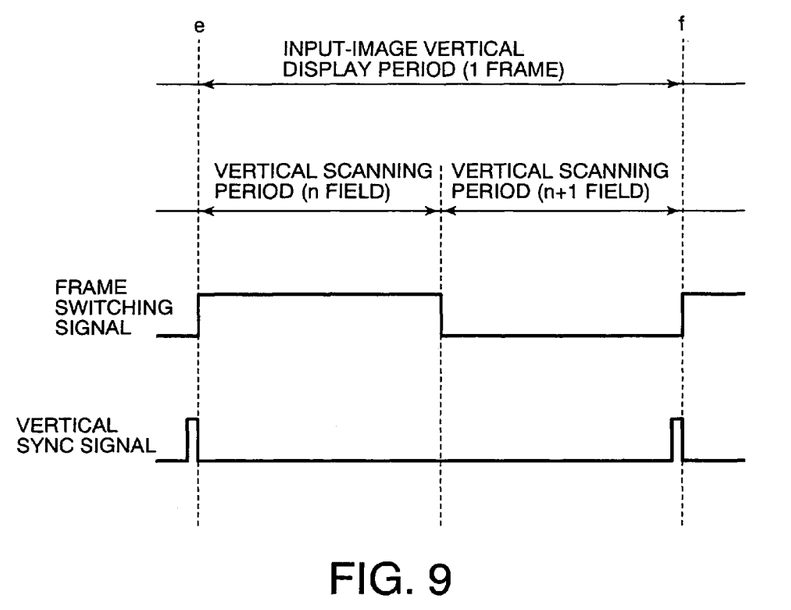
FIG. 9 shows the outline of how to drive reflective liquid crystal display devices, according to the present invention.

The outline of how to drive the reflective liquid crystal display devices 4r, 4g, and 4b is given with respect to FIG. 9.

The period from a moment "e" to another moment "f" is an input-image vertical display period corresponding to one frame.

Continuous application of a D. C. voltage to the entire one frame period could cause burning due to ions in the liquid crystals of the reflective liquid crystal display devices charged on the electrodes, change in quality of the liquid crystals due to electrolsys, etc.

A technique to avoid such phenomena is called inversion driving in which a voltage is reversed for each certain period. Inversion driving is employed in this embodiment such that one frame period is divided into two fields, with a voltage being reversed for each field (a frame switching signal in FIG. 9).

A vertical sync signal shown in FIG. 9 is inserted between two succeeding frames, for display synchronization in the vertical direction to achieve 1-frame display at a correct timing.

Figure 10:
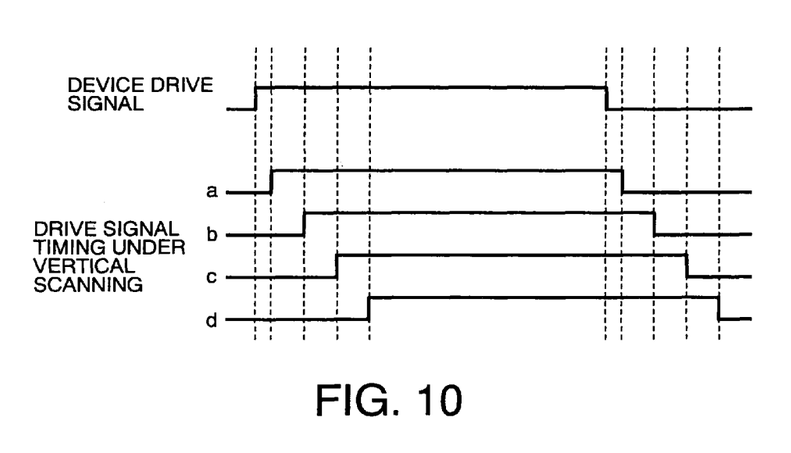
FIG. 10 shows device drive signal to be supplied to liquid crystal display devices of the projection display apparatus, according to the present invention.

Discussed next with respect to FIG. 10 are the device drive signal supplied to each of the reflective liquid crystal display devices 4r, 4g and 4b, and also its supply timing depending on the pixel locations under vertical scanning.

Liquid crystal display devices sequentially drive the pixels for each one field, not driving all of the pixels at the same time.

In this embodiment, vertical pixel scanning is performed in a direction from "a" to "d" indicated in FIG. 5, which can be performed with a known technique. With this vertical pixel scanning, device drive signals "a" to "d" shown in FIG. 10 are supplied at different timings to the pixels located at the positions "a" to "d", respectively, indicated in FIG. 5. The timing is delayed from "a" to "d" with larger phase differences.

Accordingly, when video beams optically modulated by the reflective liquid crystal display devices 4r, 4g and 4b are supplied to the liquid crystal shutter 23 (FIG. 4) to drive the liquid crystal layer 33, a projected image could not be displayed normally depending on the position on the screen (not shown), if the liquid crystal layer 33 is driven simultaneously for the entire layer surface.

To avoid such a problem, the liquid crystal layer 33 of the liquid crystal shutter 23 also requires to be divided into four driving zones, as corresponding to the four zones of the incident-side transparent conductive films 32A, 32B, 32C, and 32D shown in FIG. 5.

The signs "a", "b", "c", and "d" shown in FIG. 5 indicate the center positions in respective zones of the incident-side transparent conductive films 32A, 32B, 32C, and 32D in the vertical scanning direction.

The, the liquid crystal layer 33 of the liquid crystal shutter 23 is driven for its four driving zones corresponding to the incident-side transparent conductive films 32A, 32B, 32C, and 32D, at the same timing as the device drive signals "a" to "d" shown in FIG. 10, for displaying a projected image entirely and correctly.

Figure 11:
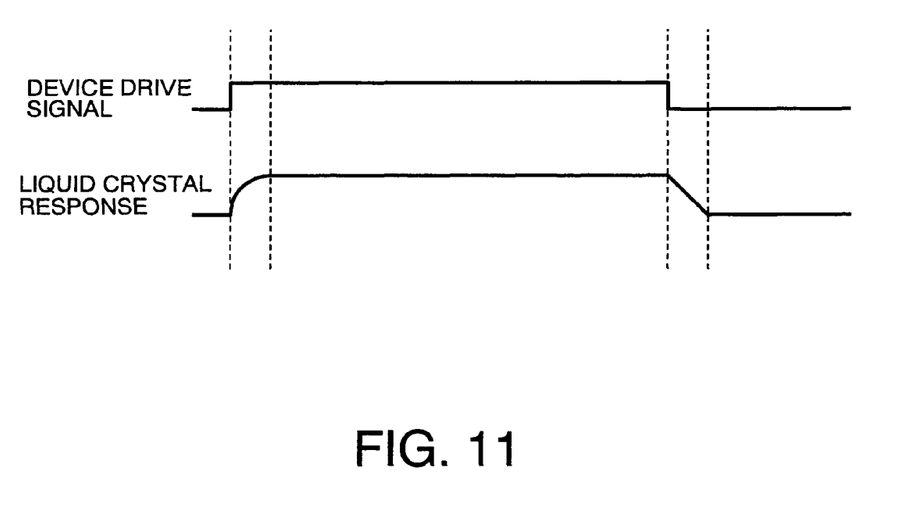
FIG. 11 shows a device drive signal to be supplied to each reflective liquid crystal display device and a response waveform of the liquid crystals of each device in response to the device drive signal, according to the present invention.

Shown in FIG. 11 is the device drive signal to be supplied to each of the reflective liquid crystal display devices 4r, 4g and 4b and a response waveform of the liquid crystals of each device in response to the device drive signal.

When the device drive signal is supplied, the liquid crystals respond in a steep manner from the initial state, with shifting into a gradual manner, and in a saturated and stable manner when a specific period elapses, and then gradually returns to the initial state when the device drive signal is terminated.

Figure 12:
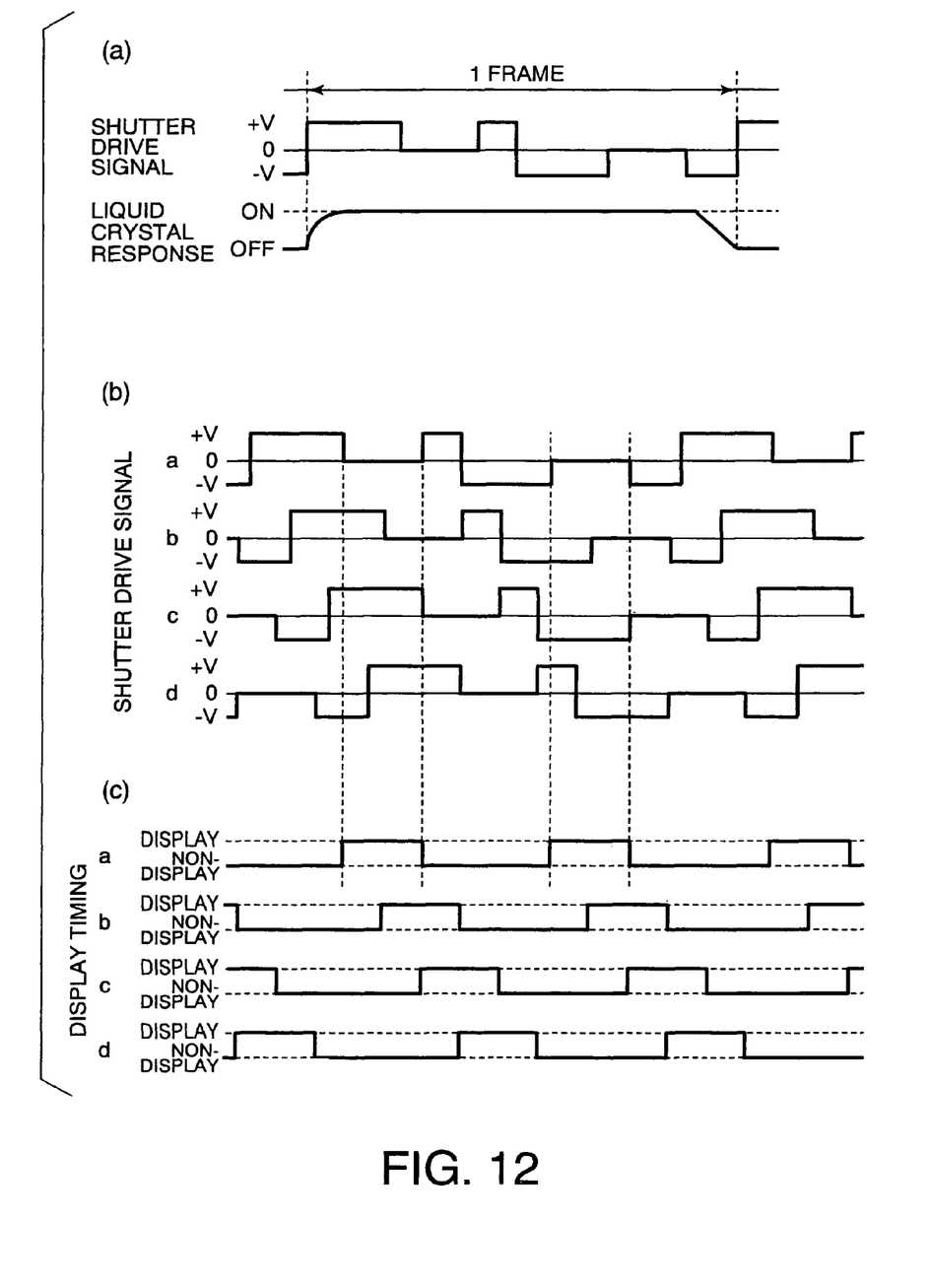
FIG. 12 shows in (a), a shutter drive signal to be supplied to the liquid crystal layer of the liquid crystal shutter and a response waveform of each reflective liquid crystal display device; in (b), shutter drive signals to be supplied to the incident-side transparent conductive films of the liquid crystal shutter; and in (c), display timings of projected images, according to the present invention.

Shown in (a) of FIG. 12 is a shutter drive signal to be supplied to the liquid crystal layer 33 of the liquid crystal shutter 23. Also shown in (a) of FIG. 12 is a response waveform of the liquid crystals of each of the reflective liquid crystal display devices 4r, 4g and 4b, identical with the response waveform shown in FIG. 11.

The shutter drive signal shown in (a) of FIG. 12 has periods in which a voltage of +V or −V is applied to the liquid crystal layer 33 having the TN liquid crystals driven in the normally white mode and other periods in which no voltage is applied to the liquid crystal layer 33. During the periods of the voltage of +V or −V, the incident linearly polarized beam is rotated by 90 degrees while traveling through the liquid crystal layer 33 and thus not allowed to travel through the polarizer 36, with no image being displayed.

In contrast, during the periods of no voltage in (a) of FIG. 12, the incident linearly polarized beam is not rotated by 90 degrees while travelling through the liquid crystal layer 33 and thus allowed to pass through the polarizer 36, with a projected image being displayed.

It is indicated by (a) of FIG. 12 that the periods during which no voltage is applied to the liquid crystal layer 33 do not overlap the rising and falling periods of the response waveform of the liquid crystals of each of the reflective liquid crystal display devices 4r, 4g and 4b.

In other words, the incident linearly polarized beam is allowed to pass through the liquid crystal shutter 23 while the liquid crystals of each of the reflective liquid crystal display devices 4r, 4g and 4b is responding in a saturated and stable manner, as discussed with respect to FIG. 11.

Shown in (b) of FIG. 12 are shutter drive signals to be supplied to the incident-side transparent conductive films 32A, 32B, 32C, and 32D. These shutter drive signals are given by delaying the drive waveform signals at the delayers 53A to 53D by certain periods and converting the delayed signals at the shutter drivers 54A to 54D, as shown in FIG. 8, so as to correspond to the device drive signals "a" to "d" shown in FIG. 10.

Shown in (c) of FIG. 12 are display timings of projected images in the order from "a" to "d", as indicated in FIG. 5, under control by the shutter drive signals, shown in (b) of FIG. 12, to the liquid crystal shutter 23.

Accordingly, there is at least one pair of periods for an image projected by the projection display apparatus 1 or 25: a period in which an image is displayed for 1 field; and a period in which no image is displayed due to being cut off by the liquid crystal shutter 23.

Moreover, as understood from (a) of FIG. 12, the image to be displayed is switched per frame for the 1-frame period, the image being cut off by the liquid crystal shutter 23 at the transition from one image to the next image, due to the voltage +V or −V being supplied during the transition.

Therefore, enlarged and projected images are displayed with less persistence of vision because the image to be displayed is cut off by the liquid crystal shutter 23 at the transition from one image to the next image.

Figure 13:
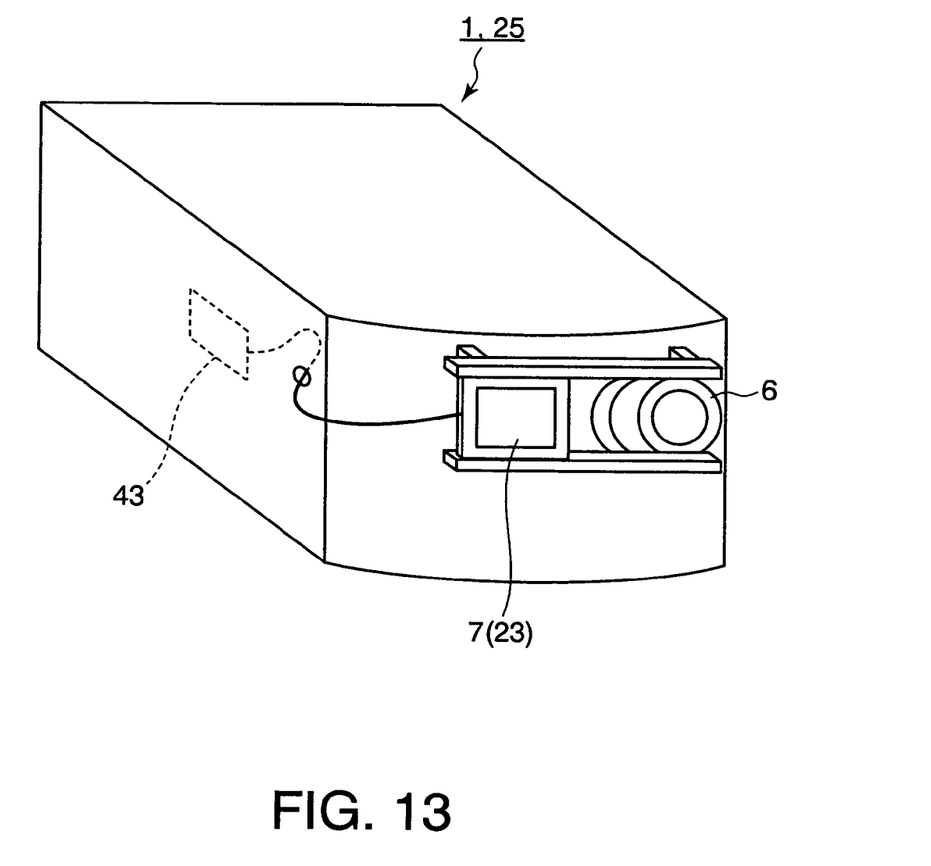
FIG. 13 shows a schematic perspective view of an appearance of the projection display apparatus, according to the present invention.

FIG. 13 shows an appearance of the projection display apparatus 1 (25), with the light-beam controller 7 (7a) having the liquid crystal shutter 23 shifted from a first position to cover the projection lens 6 to a second position for the projection lens 6 to be exposed.

The light-beam controller 7 (7a) is wired to the shutter controller 43 installed in the projection display apparatus 1 (25), however, movable between the first and second positions.

The light-beam controller 7 (7a) is shifted to the first position to cover the projection lens 6 for displaying images of a rapidly-moving object which tends to cause persistence of vision.

On the contrary, the light-beam controller 7 (7a) is shifted to the second position so that the projection lens 6 is exposed when displaying images which do not tend to cause persistence of vision, such as a slowly-moving object. The liquid crystal shutter 23 inevitably reduces the brightness of images due to the existence of the wavelength-selective polarizer 22, the polarizer 36. Thus, the light-beam controller 7 (7a) is shifted to the second position so that a bright image can be displayed for an object which do not tend to cause persistence of vision.

The light-beam controller 7 (7a) can be shifted between the first and second positions manually depending on the images to be displayed or with an automated shift mechanism that determines whether to shift the controller 7 (7a) depending on the amount of motion vectors or another feature of the images based on input signals.

Moreover, the light-beam controller 7 (7a) may be provided between the color-combining optical system 5 and the projection optical system 6.

In the embodiment, the optical systems described above are adjusted for the optically modulated beams of the colors R, G and B so that the optically modulated beams of B- and R-rays are put in the s-polarized state whereas the optically modulated beam of G-ray is put in the p-polarized state, when emitted from the cross dicroic prism 5.

The types of linearly polarized state "s" and "p" may, however, be changed for the optically modulated beams of the colors R, G and B, with adjustments to the selective wavelengths and the location of the wavelength-selective polarizer 22 in the projection display apparatus 1 (25).

When displaying images upside down with the projection display apparatus 1 (25), for instance, hung from the ceiling upside down, the driving order of the liquid crystal shutter 23 requires to be from the incident-side transparent conductive films 32D to 32A, because the vertical scanning direction at the reflective liquid crystal display devices 4r, 4g and 4b is set from "d" to "a" in FIG. 5.

Moreover, when displaying images at vertical scanning in the direction from the center to "a" and "d" in FIG. 5, the driving order of the liquid crystal shutter 23 requires to be from the incident-side transparent conductive films 32C and 32B to 32D and 32A.

As disclosed above in detail, the present invention provides a projection display apparatus and a display method using the projection display apparatus that can reduce persistence of vision for enlarged and projected images of a rapidly moving object and for liquid crystal display devices of a relatively low response time, thus making an apparent response time higher for images to be displayed.

What is claimed is:

1. A projection display apparatus comprising:
a light source to emit a light beam;
an illumination optical system through which the emitted light beam undergoes linear polarization;
at least one liquid crystal display device to optically modulate the linearly-polarized light beam based on an input signal;
a projection optical system to enlarge the optically-modulated light beam and project the enlarged light beam onto a screen; and
a light-beam controller provided on an optical axis of the optically-modulated light beam, to allow the optically-modulated light beam to travel therethrough to reach the screen or cut off the optically-modulated light beam, under control by a control signal,
wherein the light-beam controller has a plurality of driving zones on which the optically-modulated light beam is incident, the driving zones being provided in a direction corresponding to a vertical scanning direction of pixels of the liquid crystal display device, the light-beam controller being driven per driving zone in a specific order of the driving zones at a timing of vertical scanning of the pixels under control by the control signal that is generated based on a vertical synchronization signal detected from the input signal, thus the optically-modulated light beam being allowed to travel through the light-beam controller or cut off when the optically-modulated light beam is incident on the driving zones at the timing of the vertical scanning.

2. The projection display apparatus according to claim 1, wherein the light-beam controller includes:
a liquid crystal layer on which the optically-modulated light beam is incident and a polarization state thereof is converted under control by the control signal;
a first transparent conductive film and a second transparent conductive film formed on a beam-incident side and a beam-emitting side of the liquid crystal layer, respectively, to function as electrodes to drive the liquid crystal layer, at least either the first or the second transparent conductive film being divided into the driving zones and driven per driving zone in the specific order, thus the liquid crystal layer being driven through the driving zones of the first or the second transparent conductive film at the timing of the vertical scanning; and
a polarizer provided at the beam-emitting side of the liquid crystal layer via the second transparent conductive film, to allow the light beam that has traveled through the first transparent conductive film, the liquid crystal layer, and the second transparent conductive film to reach the screen or cut off the light beam depending on the converted polarization state of the light beam.

3. The projection display apparatus according to claim 1 wherein the illumination optical system has an optical mechanism of applying the linearly-polarized light beam to a plurality of liquid crystal display devices each optically modulating the linearly-polarized light beam based on an input signal,
the projection display apparatus further comprising:
a beam-combining optical system to combine light beams optically modulated by the liquid crystal display devices, the combined optically-modulated light beams being supplied to the projection optical system; and
a polarizer to convert the combined optically-modulated light beams into a single polarization state, before or after the combined optically-modulated light beams is supplied to the projection optical system, by rotating an axis of at least one optically modulated light beam of the combined optically-modulated light beams by 90 degrees when the one optically modulated light beam is in a first polarization state and other optically-modulated light beams of the combined optically-modulated light beams are in a second polarization state that is different from the first polarization state.

4. The projection display apparatus according to claim 1 wherein the illumination optical system has an optical mechanism of applying the linearly-polarized light beam to a plurality of liquid crystal display devices each optically modulating the linearly-polarized light beam based on an input signal,
the projection display apparatus further comprising:
a polarizer to convert linearly-polarized light beams optically modulated by the liquid crystal display devices into a single polarization state by rotating an axis of at least one of the optically modulated light beams by 90 degrees when the one optically modulated light beam is in a first polarization state and others of the optically-modulated light beams are in a second polarization state that is different from the first polarization state; and a beam-combining optical system to combine the linearly-polarized light beams converted into the single polarization state, the combined light beams being supplied to the projection optical system.

5. The projection display apparatus according to claim 1 wherein the light-beam controller is provided as shiftable from the optical axis of the optically-modulated light beam so that the optically-modulated light beam can be projected onto the screen without under control by the light-beam controller.

6. A display method for a projection display apparatus including at least one liquid crystal display device to optically modulate an input linearly-polarized light beam based on an input signal, the linearly-polarized light beam thus optically modulated being enlarged and projected onto a screen, and a light-beam controller provided on an optical axis of the optically-modulated light beam, the light-beam controller having a plurality of driving zones on which the optically-modulated light beam is incident, the driving zones being provided in a direction corresponding to a vertical scanning direction of pixels of the liquid crystal display device, the method comprising the steps of:

detecting a synchronizing signal from the input signal;

sequentially driving the pixels of the liquid crystal display device based on the input signal in accordance with the detected synchronizing signal, thus the input linearly-polarized light beam being optically modulated; and controlling the optically-modulated light beam by driving the light-beam controller per driving zone in a specific order of the driving zones at a timing of vertical scanning of the pixels under control by a control signal that is generated based on a vertical synchronization signal detected from the input signal, thus the optically-modulated light beam being allowed to travel through the light-beam controller to reach the screen or cut off when the optically-modulated light beam is incident on the driving zones at the timing of the vertical scanning.

7. The display method according to claim 6, wherein the projection display apparatus has a plurality of liquid crystal display devices each optically modulating an input linearly-polarized light beam based on an input signal, the method comprising the step of combing input linearly-polarized light beams optically modulated by the liquid crystal display devices, the controlling step controlling the combined linearly-polarized light beams.

8. The display method according to claim 7 further comprising the step of converting the optically-modulated light beams into a single polarization state, before or after the combining step, by rotating an axis of at least one optically modulated light beam of the combined optically-modulated light beams by 90 degrees when the one optically modulated light beam is in a first polarization state and other optically-modulated light beams of the combined optically-modulated light beams are in a second polarization state that is different from the first polarization state.

9. The projection method according to claim 6 further comprising the step of shifting the light-beam controller from the optical axis of the optically-modulated light beam, based on the input signal, so that the optically-modulated light beam can be projected onto the screen without under control by the light-beam controller.

* * * * *